United States Patent [19]
Grayson

[11] Patent Number: 4,805,935
[45] Date of Patent: Feb. 21, 1989

[54] CHILD PROTECTOR AND SHOPPING BASKET ALIGNER

[76] Inventor: Leslie E. Grayson, 1088 Lupin Ave., Chico, Calif. 95926

[21] Appl. No.: 86,577

[22] Filed: Aug. 18, 1987

[51] Int. Cl.⁴ .............................................. B62B 11/00
[52] U.S. Cl. ................................................ 280/33.992
[58] Field of Search ................ 280/33.99 A, 33.99 R, 280/33.99 H, 33.99 B

[56] References Cited
U.S. PATENT DOCUMENTS 3,813,111 5/1974 Ruger ........................... 280/33.99 A
3,999,774 12/1976 Rettrig ........................ 280/33.99 R Primary Examiner—David M. Mitchell

[57] ABSTRACT

The invention provides a seat-like covering with wheel fenders which snapps over the lower grill onto the wheel frame of a modern shopping cart. The shape of the seat and fenders prevent a child who is sitting on the lower grill in the wheeled frame of a shopping cart from accidently being injured by putting a hand on the turning wheels. The fender shape acts as a basket aligner when several of the wheeled shopping baskets are placed together for transporting.

2 Claims, 1 Drawing Sheet

CHILD PROTECTOR AND SHOPPING BASKET ALIGNER

BACKGROUND OF THE INVENTION

1. Field of the Invention

This invention relates to protective structures for covering the bumper extension above the front wheels on a modern shopping basket. The present invention is particularly directed towards a seat-like covering with wheel fenders which prevent a child who is sitting in the wheeled frame of the cart from accidentally being injured by putting a hand on the turning wheels. The fender design of the present invention also acts as a basket aligner when several of the wheeled shopping baskets are placed together for transporting.

2. Description of the Prior Art

In past art patents seen, devices useful for the above stated purposes are not prevalent. A protective mat useful in the grocery basket is shown in U.S. Pat. No. 2,832,599, issued Apr. 22, 1958, to J. V. Graffeo, and in Umanoff's U.S. Pat. No. 3,019,953, allowed Feb. 6, 1962, a squared fitting to hold a box or container on the shopping cart lower frame is illustrated. A second patent issued to Umanoff on Aug. 7, 1962, U.S. Pat. No. 3,043,420, shows a three-wheeled grocery cart having an antitipping device for child protection.

Other methods of approaching the child protection problem are seen in the plastic framed basets of Ganci, U.S. Pat. No. 3,614,133, dated Oct. 19, 1971, and the all plastic shopping cart of Thompson, Jr. U.S. Pat. No. 4,046,394, dated Sept. 6, 1977. The Modular Part Cart of Castellano, U.S. Pat. No. 4,097,056, issued June 27, 1978 shows a box framed undercarriage.

Of the patents seen, the foregoing appear to be the most pertinent state-of-the-art patents. A protection device for a child sitting on the undercarriage of a shopping cart does not seem to be considered.

SUMMARY OF THE INVENTION

The present invention is provided as a snap-on covering for the frontal underframe of a shopping basket. The device has four basic functions. (1) A solid seat is provided for the child who insists on riding up front below the grocery rack. (2) Fenders and side handles are provided to prevent the child from getting fingers in the rotating or swiveling front wheel. (3) A cross stop is provided near the front section of the lower cart frame which prevents groceries from sliding forward and onto the floor when sudden stops are made. (4) When the pliable curved fenders slide along the lower frame of other shopping cart, the carts are forced into an alignment which greatly facilitates transporting lines of interlocked shopping carts.

This invention has as a principal object the protection of a child's fingers while riding on the underframe of a store-type wheeled shopping basket by providing a protective seat-like covering on the frontal frame section.

Another object of the present invention is to provide a protective covering to the frontal wheel frame of a shopping basket which has a horizontally positioned raised backing to prevent groceries carried on the rear of the wheel frame from sliding forward and off the carriage due to a sudden stop.

A still further object of this invention is to provide a protective covering for the front wheel frame of a grocery-type wheeled basket which has curved fenders fitted above the front swivel wheels being useful both as finger protectors and as basket aligners to positioning the fronts of interlocked baskets in alignment for transportation.

Other objects and the many advantages of my invention will become better understood by a reading of the numbered parts in the specifications in conjunction with like numbered parts on the included drawings.

REFERENCE NUMERALS

Figure 1:
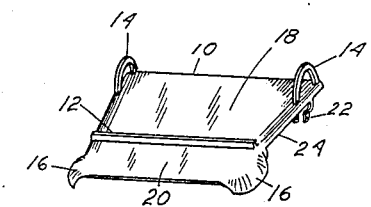
FIG. 1 is a perspective view of my child protector and shopping cart aligner.

10 child protector
12 grocery stop
14 handle
16 front wheel fenders
18 seat
20 leg shield
22 mounting clips
24 protective runners
26 shopping cart
28 basket
30 lower grill
32 frame
34 frame nose
36 swivel caster
38 swivelling front wheel
40 nonswivelling rear wheel
42 groceries
44 child

DESCRIPTION OF THE PREFERRED EMBODIMENT

Figure 8:
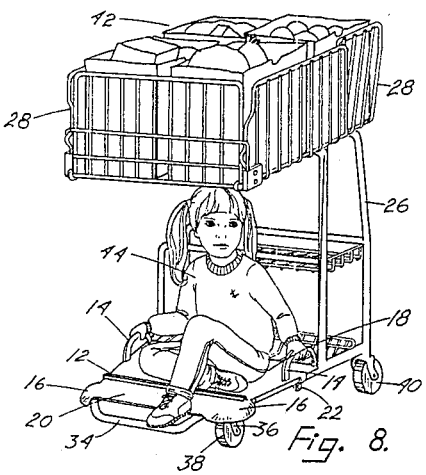
FIG. 8 is a perspective view of the child protector installed and in use on the lower grill and frame of a modern shopping cart.

Referring now to the drawings. Child protector 10 is designed to fit and cover the lower grill 30 of shopping cart 26 so child 44 can safely ride on the lower grill 30 as illustrated in FIG. 8. As shown in the perspective drawing at FIG. 1, child protector 10 is affixed with grocery stop 12, handles 14, front wheel fenders 16, seat 18, leg shield 20, and protective runners 24. Child protector 10 fits over and covers lower grill 30 and is attached to frame 32 by clips 22. Child protector 10, when not used by child 44, can remain attached to shopping cart 26 and groceries can be transported thereon retained by grocery stop 12 with more efficiency then groceries riding on the bare lower grill 30.

Figure 2:
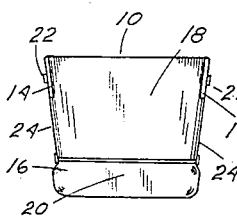
FIG. 2 shows my child protector in a top plan view.
Figure 3:
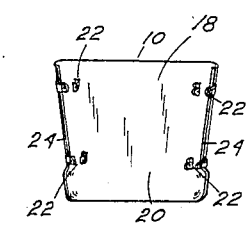
FIG. 3 shows the child protector in a view of the bottom side.
Figure 4:
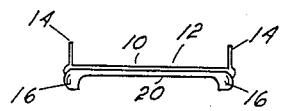
FIG. 4 is a frontal view of the child protector horizontally aligned.
Figure 5:
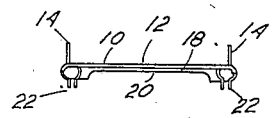
FIG. 5 shows the protector reversed from FIG. 4 in a rear view horizontally aligned.

FIG. 2 shows child protector 10 in a top plan view illustrating the relative positions of seat 18 to grocery stop 12 and leg shield 20. Handles 14 are attached to the sides of child protector 10 at the wider end of seat 18. Protective runners 24 are downwardly angled side extension of seat 18, and front wheel fenders 16 cover the swivel casters 36 of swivelling front wheels 38. Front wheel fenders 16 are dual purpose in that they prevent child 44 from placing her fingers on swiveling front wheels 38 and they act as aligners when a series of shopping carts 26 are placed together for transporting. FIG. 3 shows child protector 10 from the attach or bottom side and illustrates the positioning of mounting clips 22. FIG. 4 shows child protector 10 in a frontal view with grocery stop 12 crosswise and handles 14 vertically positioned. Front wheel fenders 16 and leg shield 20 are shown in FIG. 4 downwardly inclined. FIG. 5, in a rear view of child protector 10, shows mounting clips 22 affixed at the edges below seat 18 behind front wheel fenders 16.

Figure 6:
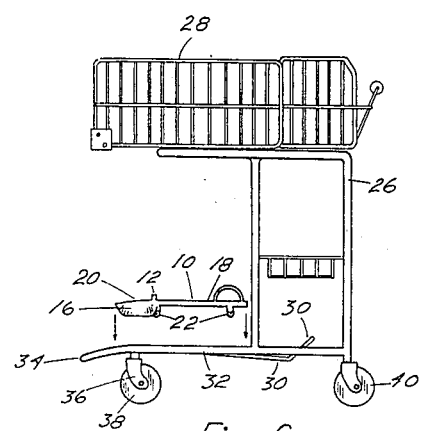
FIG. 6 shows my child protector positioned for installation on the lower grill of a shopping cart.
Figure 7:
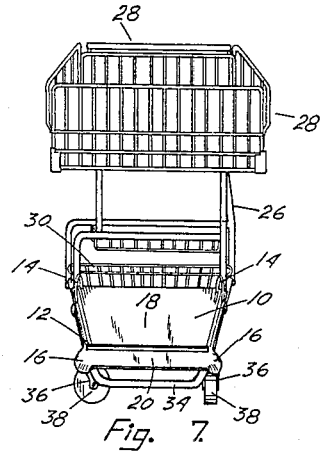
FIG. 7 illustrates the child protector and shopping cart aligner installed on a shopping cart lower grill and attached by clips to the frame in a frontal view.

FIG. 6 is a side view of shopping cart 26 with basket 28 upwardly and lower grill 30 downwardly to illustrate child protector 10 in a position for mounting to frame 32 as a covering for lower grill 30. In the frontal view of shopping cart 26 at FIG. 7, child protector 10 is shown mounted to frame 32 near frame nose 34.

In use, as shown in FIG. 8, child 44 can safely ride on seat 18 of child protector 10 and have support from handles 14. Basket 28 can be entirely filled by groceries 42 as the child seat in basket 28 is not in use. Child 44 has hand and finger protection by protective runners 24 along the sides of seat 10 and by front wheel fenders 16 covering swivelling front wheels 38. Child 44 also has leg protection in that leg shield 20 prevents child 44 from getting her feet down on the floor inside of nose frame 34.

Although I have described my invention with considerable details in the specification, it is to be understood that some modifications in the design and changes in the structure may be practiced so long as such changes do not exceed the scope of the appended claims.

What I claim is:

1. A seat-like covering sized to fit an upper frontal portion of the wheel-attach frame section on a grocery shopping cart removably retained by snap-on clamp fitting comprising;
   - a substantially rectangular panel shaped with one wide end and two sides slanting inwardly from said wide end to a somewhat narrowed end, said panel arranged for horizontal placement on the upper side of said wheel-attach frame of said grocery shopping cart with the upwardly surface designated top, the downwardly surface designated bottom, said wide end being the back thereof and positioned towards the vertical frame of said shopping cart, said narrowed end being the front thereof and positioned somewhat frontward of the swivel-attachment affixing the front wheels to said grocery shopping cart, said front, at the corners thereof, rounded outwardly and cupped downwardly into fender-like coverings over said swivel attachments and the upper part of said front wheels, said sides having edges thereof beveled downwardly forming protective runners paralleling side members of said wheel-attachment frame;
   - said panel said top thereof affixed adjacent to and paralleling said front with a short grocery-stop ridge;
   - said panel said top thereof affixed at said sides towards said back thereof with two low profile handles longitudinally aligned paralleling the edge on each said side;
   - said panel said bottom thereof affixed with at least four said snap-on clamp fittings two along each said side positioned cornerwise in alignment to snap downwards over said side members of said wheel-attach frame.

2. The seat-like covering of claim 1 wherein said snap-on clamp fittings are apertured for nut and bolt attachment to said wheel-attach frame of said shopping cart.

* * * * *